SIMULTANEOUS BILATERAL TELEVIDEOPHCNIC COMMUNICATION SYSTEMS

Filed Feb. 19, 1963 6 Sheets-Sheet 1

INVENTOR
AURELIO BELTRAMI
BY Irwin S. Thompson
ATTORNEY

INVENTOR
AURELIO BELTRAMI
BY Irwin S. Thompson
ATTORNEY

July 26, 1966 A. BELTRAMI 3,263,027

SIMULTANEOUS BILATERAL TELEVIDEOPHONIC COMMUNICATION SYSTEMS

Filed Feb. 19, 1963 6 Sheets-Sheet 3

INVENTOR
AURELIO BELTRAMI

BY Irwin S. Thompson

ATTORNEY

July 26, 1966 A. BELTRAMI 3,263,027

SIMULTANEOUS BILATERAL TELEVIDEOPHONIC COMMUNICATION SYSTEMS

Filed Feb. 19, 1963 6 Sheets-Sheet 4

INVENTOR

AURELIO BELTRAMI

BY Irwin S. Thompson

ATTORNEY

July 26, 1966 A. BELTRAMI 3,263,027

SIMULTANEOUS BILATERAL TELEVIDEOPHONIC COMMUNICATION SYSTEMS

Filed Feb. 19, 1963 6 Sheets-Sheet 5

INVENTOR

AURELIO BELTRAMI

BY Irwin S. Thompson

ATTORNEY

July 26, 1966 A. BELTRAMI 3,263,027

SIMULTANEOUS BILATERAL TELEVIDEOPHONIC COMMUNICATION SYSTEMS

Filed Feb. 19, 1963 6 Sheets-Sheet 6

INVENTOR

AURELIO BELTRAMI

BY Irwin S. Thompson

ATTORNEY

United States Patent Office 3,263,027
Patented July 26, 1966

3,263,027
SIMULTANEOUS BILATERAL TELEVIDEOPHONIC COMMUNICATION SYSTEMS

Aurelio Beltrami, Via Circo 4, Milan, Italy
Filed Feb. 19, 1963, Ser. No. 259,525
Claims priority, application Italy, Dec. 11, 1962, 29,814/62
5 Claims. (Cl. 178—6.8)

The present invention relates to a system of television-telephony for the simultaneous bilateral transmission of video and phonic signals or intelligence of different kinds between two or more people or exchanges.

More precisely, it is an object of the present invention to provide a televideophonic system that permits, simultaneously with the sound transmission, also the bilateral transmission of images so that two people that are interconnected by such a system can not only hear but also see each other.

Such a system has already been proposed but the resulting apparatus was expensive, complicated, and such as to require, in place of the conventional telephone apparatus, much larger, heavier, and expensive equipment.

The present invention uses elements and circuits such as to permit simultaneous multiple bilateral televideophonic communication with equipments that are substantially simple, inexpensive, and require only light weight and compact apparatus.

In particular, in a televideophonic system according to the present invention, every receiving-transmitting post comprises a cathode ray tube adapted to operate, at predetermined alternate intervals, as a kinescope, whereon appears the image received, and as a telecamera, that functions as a scanning device for the object to be transmitted.

The present invention comprises also some particular embodiments that can be derived from the televideophonic system considered above, such as installations wherein one or more subscribers can only hear the others, while these last ones can hear and see, or only see the first ones, as well as the installations wherein one post can be seen and heard by the others, while these are neither seen nor heard by the first one.

Another very important object of the present invention is to provide apparatus for multiple televideophony.

It is a further object of the present invention to provide a system for the video transmission to a predetermined control or relay post as the result of control signals transmitted by wire or wireless from the control post.

An important feature of a system according to the present invention is the adoption, for generating the reticle on the cathode ray tubes operating as kinescopes, or as scanning camera tubes, of at least one device comprising: a revolving element (disc or cylinder) on which there are traced one or more pattern or tracks adapted to modulate, by transparence or reflection, radiations that, in the form of a thin blade, scan the above mentioned tracks; transducing elements, one for each of the above tracks, and adapted to transform said modulated radiations into periodic electrical magnitudes to provide the television reticle, and to control the switching operation of the cathode ray tubes from image receivers to image transmitters, as well as a small synchronous motor for driving the above mentioned revolving element carrying the tracks.

In the following description, there will be illustrated and described in detail several embodiments of televideophonic installations, as well as some particular instances of same, and several details of elements constituting said installations.

From this description there will also clearly appear the advantages of the present invention since it is now made possible to eliminate at every transmitting-receiving post of the installation the oscillation generators for forming the reticle on the respective cathode ray tube, as well as the system and circuits normally required to assure the line and frame synchronisms between the subscriber posts communicating with each other.

This is obtained, as already stated, because of the adoption, in combination with the cathode ray tubes, of reticle generators that do not require electronic oscillators, but merely oscillograms or patterns adapted to modulate the radiations (which may be luminous, or invisible, or from radioactive isotopes) which are then transformed by means of suitable transducers into periodic electrical magnitudes that will be in a strict phase coincidence among themselves, since the above said modulating oscillograms or patterns are traced on a same support, and since the rotational speeds of the small motors driving each rotating element carrying said oscillograms are exactly equal and in phase with each other.

Such reticle generators may be provided either one at each receiving and transmitting post, or one single generator at the manual or automatic exchange of a simultaneous bilateral televideophonic system. In this last case the reticle generating voltages and the switching voltage will be transmitted as a composite signal from the exchange to every subscriber who is calling or called by another.

The small motors adopted for said generators shall preferably be two-pole synchronous motors and, for the installations involving one of said generators at each subscriber's post, the small motor of each subscriber called shall be fed from the very videophonic signal transmitted from the transmitting end of the calling subscriber, whereby there is assured a perfect and steady synchronism between the electric voltages generating the reticle of the cathode rays tubes of the two subscribers interconnected, as well as the electric voltages that, at both ends, control the switching of the cathode ray tube operation.

Other objects and advantages of the present invention will in part be evident and in part described in the following specification, considered together with the accompanying drawings.

In the description and in the drawings there are considered three different embodiments of a bilateral televideophonic system installation, as well as a particular instance, namely a one-way televideophonic installation that permits the simultaneous transmission of video signals and of two different phonic signals.

Figure 6:
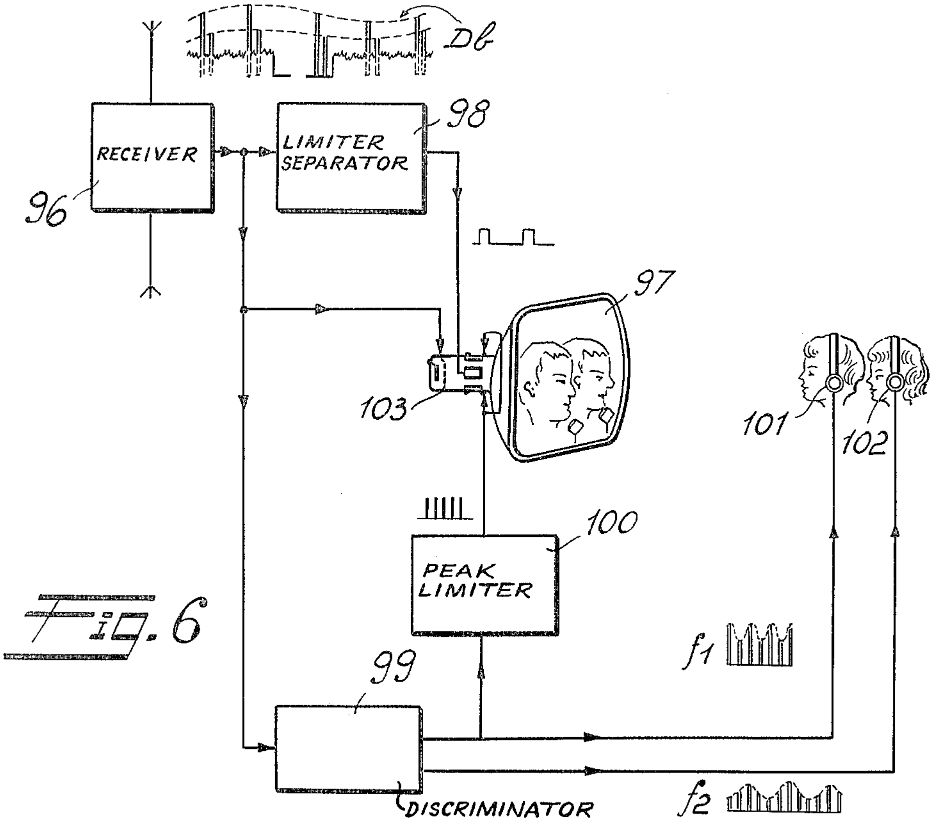
Figure 7:
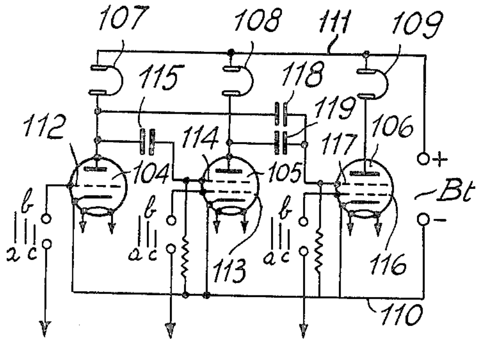
Figure 7A:
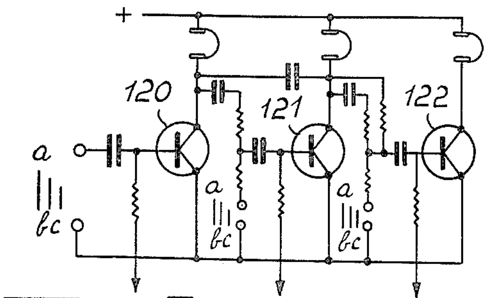

FIGURES 7 and 7*a* show in detail the discriminating circuit used in the receiver of FIGURE 6, one of which, namely that shown in FIGURE 7, utilizes thermionic valves, and that of FIGURE 7*a* uses semiconductors.

In the drawings are shown the shapes of the different signals resulting at the most characteristic points of the single circuits.

Figure 1:
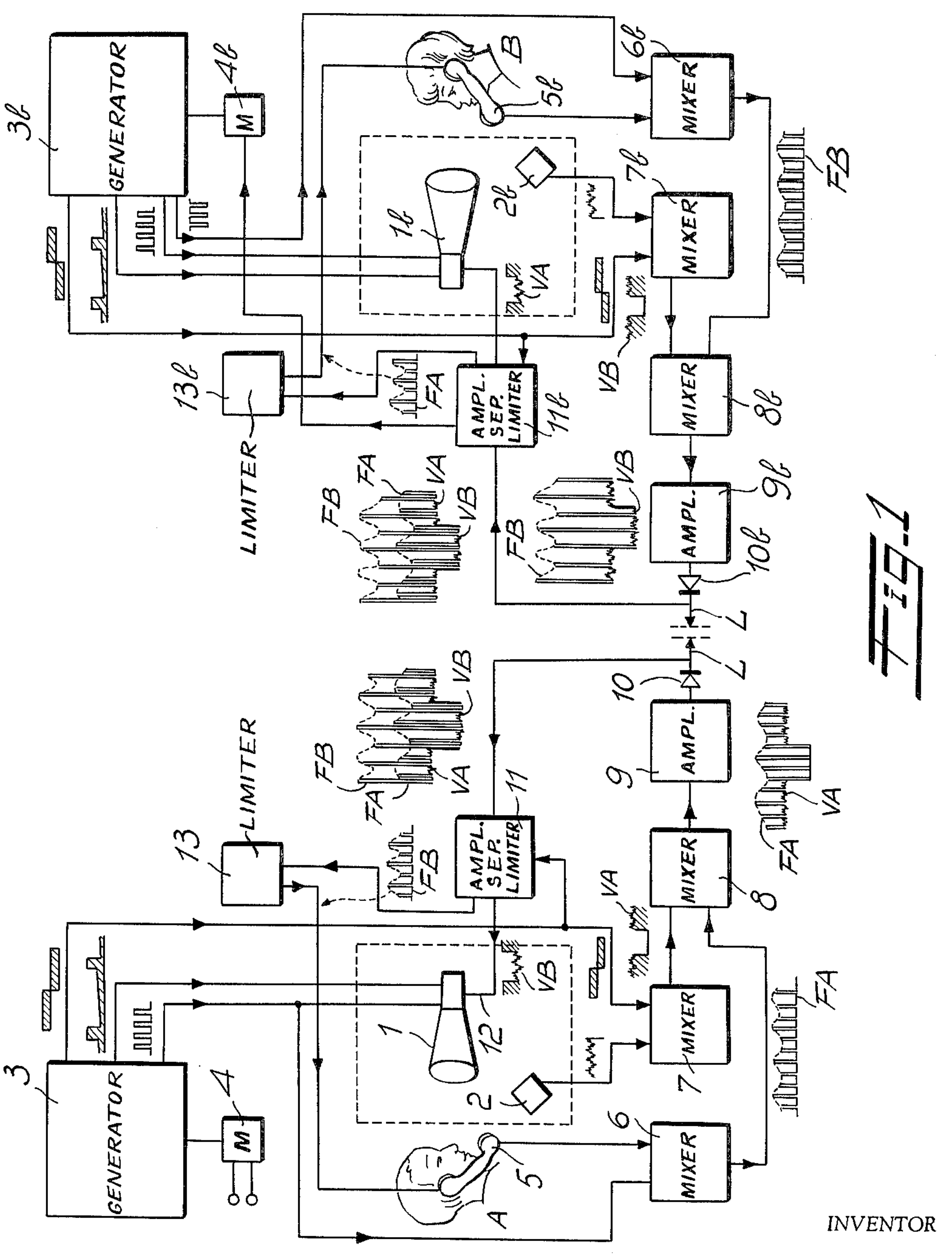
FIGURE 1 shows the block diagram of a bilateral televideophonic installation, according to the present invention, in its most simple form, that is, for wire transmission and where only two subscribers are shown.

In FIGURE 1 there are diagrammatically shown the apparatus concerning two subscribers A and B that are capable of being interconnected for mutual televideophonic communication.

The apparatus at each of the subscribers in an installation, as considered above, consists of the elements that will now be described, and that are illustrated in FIGURE 1, both for subscriber A and subscriber B.

Said elements, in particular for subscriber A, are the following: for the video section, a cathode ray tube 1, adapted to operate for short alternate intervals as a kinescope receiving the image of subscriber B, and as a scanner of the figure (or other part) of subscriber A, that will be seen by subscriber B. Combined with the tube 1, there is a photocell 2 on which are reflected the scanning rays emitted by the tube 1 during the intervals when same operates as a scanner for the transmission to B of the image of A.

The rotating generator 3 supplying the voltages required for forming the reticle on the kinescope 1 screen, as well as the switching voltage, includes the rotating member carrying the modulating tracks, as it will be better described hereunder, and the small driving motor 4 that will also be considered more in detail later on.

The voltages generated by the rotating generator 3 will also be used as carriers for the video and phonic signals to be transmitted and, to this end there are provided modulating and mixing devices, as it will be better stated hereunder.

For the phonic section, there is provided a telephone hand set 5 of a conventional type and size. With said elements there are combined, for the transmission from A to B, a modulator or mixer 6 for modulating the line frequency impulses originated in a generator 3 with the phonic signals originating from the microphone of the hand set 5, a mixer 7 of the video signals supplied by the photocell 2 with the switching signal, also supplied from the generator 3; a mixer 8 for the signals coming respectively from the mixers 6 and 7; an amplifier 9 for the complete signal appearing at the output of the mixer 8 comprising the video signal as well as the phonic one.

The amplified signal at the output of 9 passes through the crystal rectifier 10 and thence over the line L interconnecting the subscribers A and B.

For a better understanding of the invention, in the FIGURE 1 as well as in the other figures, there are diagrammatically shown the shapes and directions of the different signals, and in particular: VA and VB indicate the video signals, and FA and FB the phonic signals, respectively of the subscribers A and B.

For receiving at the A side the videophonic signals transmitted by B, the apparatus as the subscriber A comprises, in addition to the elements already considered, an amplifier separator-limiter 11 for the complete videophonic signal transmitted by B through the wire L which is further sent through the lead 12 to the modulating grid of the kinescope 1. A second output of the amplifier 11 feeds the limitator 13 with the phonic signal that is then supplied to the telephone of the hand-set 5.

The receiving-transmitting end of the subscriber B is similar to that of the subscriber A, and will be explicitly considered when describing the operation of the system.

There will now be described, in a more detailed way, and with reference to the FIGURE 2 of the accompanying drawings, the cathode ray tube 1 corresponding exactly to the tube **1*b* of the subscriber B. The generators 3 and 3*b*** are similar as are other elements at subscriber A and subscriber B stations.

Figure 2:
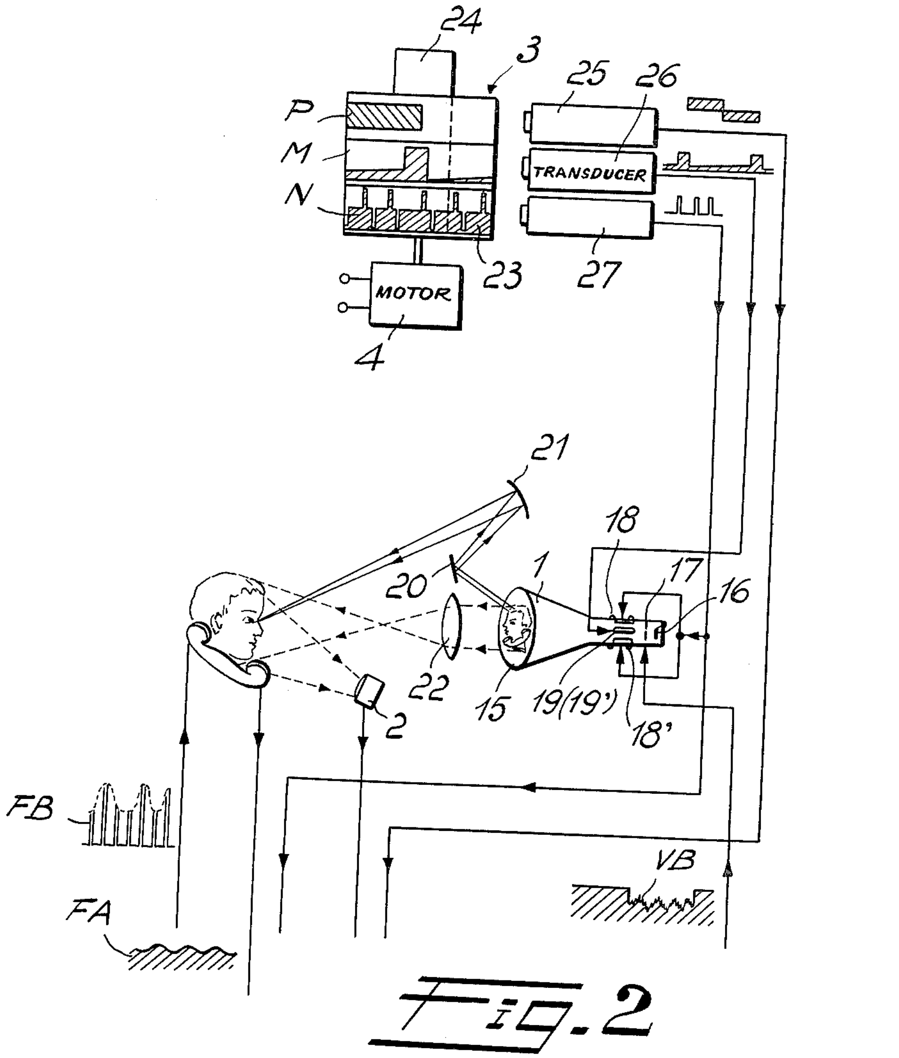
FIGURE 2 shows diagrammatically, but in a somewhat more detailed way, the apparatus comprising the cathode ray tube and the rotating generator of the television reticle of one of the two receiving and transmitting posts illustrated in FIGURE 1.

As is clearly apparent from the FIGURE 2, the cathode ray tube 1 is provided with a fluorescent screen 15, a cathode 16, a modulating grid 17, while on the neck of said tube there are placed the deflection coils for the cathodic beam, generating the recticle on the screen 15, namely the pair of coils 18, 18′ for the horizontal displacements of said beam, at line frequency, as well as the pair of coils 19 and 19′, for deflecting said beam in a vertical direction, at the frame frequency.

Combined with the screen 15 of the tube 1 there is a flat mirror 20 reflecting the rays coming from said screen onto the concave mirror 21, on which there is seen by the subscriber A the enlarged image of the subscriber B that, in the reception intervals, is formed on the screen 15 of the tube 1. The intervals in which there are formed the images on screen 15 follow very quickly one upon the other whereby, due to the persistence of the images on the retina, the image of the subscriber B on the concave mirror 21 will appear to the subscriber A as a steady picture, that is, practically as if the tube 1 were operating continuously as a kinescope, and not only for half the time, during which there is going on the communication between the two subscribers.

With the tube 1 there is also combined an objective lens 22 for concentrating the beam that is scanning the figure of the subscriber A during the intervals alternated with the reception ones, and during which the image of the subscriber A is sent to the subscriber B. The photoelectric cell 2, during such intervals, receives the rays corresponding to the scanning beam as reflected from the figure of the subscriber A and transforms these radiations into electric signals which, as already stated, and as is well known, are sent to the electronic device 7 (FIGURE 1) where said signals are first mixed with the switching signal, and successively with the signal from the output of 6 at mixer 8. The signals are then amplified for transmission to the receiving post of the subscriber B.

The television reticle generator 3, according to FIGURES 1 and 2, comprises a rotating cylinder 23 constituted by a sheet of material transparent to the chosen type of radiations which, in the instance illustrated, are supposed to be of the luminous type. The source of said radiations is indicated by 24 and is located inside the small cylinder 23 that carries along three different parallel bands three oscillograms or tracks, partially opaque, and designed so as to generate the wanted signals. The first oscillogram or track P, in the illustrated instance, is constituted by a stripe, opaque to the radiations of the source 24, extending over half the development of the cylindrical surface 23, while the other half of said stripe is perfectly transparent to the luminous ray supplied by the source 24 through a screen having a thin slot. The track M is the one provided for generating the frame frequency voltage to be sent to the coils 19 and 19′ for generating the reticle. The diagram in this case has the shape clearly illustrated in the drawing. The track N is constituted by a pattern designed so as to generate a line frequency electric voltage to be sent to the coils 18 and 18′ for generating the reticle. Such coils could also be fed with the line frequency signal generated by the generator **3*b*** of the subscriber B, and sent to A together with the other signals, as the carrier of the B phonic signal.

Combined with these three tracks, provided on the drum 23, there are three transducers that, in the case considered, are of the photoelectric type and that, in FIGURE 2, are diagrammatically shown with 25, 26, 27, and assumed combined with suitable amplifiers. Said transducers transform the modulated light rays from the three tracks P, M and N into electric magnitudes varying in a corresponding way that are sent to the different elements of the receiving end at the subscriber A, as already stated in connection with the FIGURE 1.

The shape of the three voltages generated by the three transducers 25, 26, 27 is diagrammatically shown near respectively to the three leads coming out from each of the above mentioned transducers.

The small motor 4, of the synchronous type with a ferrite rotor, is designed so as to drive the small cylinder 23 at a perfectly uniform speed. Said motor, in the case as illustrated, is fed from a standard power supply network that is here presumed to be at a frequency of 25 cycles per second. The power will be fed from the signal received from the other subscriber B when subscriber A, instead of calling is called.

The small motor 4b at the receiving end at the subscriber B is perfectly identical with the small motor 4 and is provided for driving the small cylinder of the reticle generator 3b at the subscriber B. Said motor, in the case considered, where B is the called subscriber, will not be fed, as the small motor 4, from a standard power supply network, but from the voltage corresponding to the complete signal that arrives at the receiving end of the subscriber B through the wire conductor L after having been suitably amplified by the amplifier 11b.

With such expedient the synchronism and a perfect phase correspondence between the small motor 4 and the small motor 4b are assured and thereby the perfect correspondence of the operating switchings of the two cathode ray tubes, both at the subscriber A and at the subscriber B, are rigorously assured.

The operation of the above described system is as follows: The network frequency, supplying the small motor 4, is assumed to be 25 cycles per second. Then, since the small motor has two poles, the cylinder 23 carraying the tracks will run at 25 revolutions per second. If it is wanted to obtain a frame frequency of 50, inasmuch as the frames have alternately to correspond to the scanning and to the reception, the track M will contain two full oscillations. It will then be possible to choose a line frequency equal to 50 lines for each frame, whereby there is obtained a reasonable transmisison of the figure, or a line frequency of 100 or over, and the track N, generating this line frequency, will vary in relation to the selected value.

Suppose now that the subscriber A desires to communicate with the subscriber B. The subscriber A picks up his telephone hand set and actuates the call elements that will cause a call signal in correspondence with the subscriber B, and will close the switch controlling the electric power supply to the small motor 4 and to the system. The small beam of cathode rays coming from the cathode 16 of the tube 1 will describe a reticle with the image, while during the next reticle without image, it will operate as a scanner of the subscriber A figure. This is due to the switching action controlled by the voltage generated, as already stated, by the third track P present in the electric voltage generators 3 and 3b, that is, for the duration of one frame, i.e. for 20 milliseconds, the cathode ray beam, emitted by 16, will be modulated by the grid 17 receiving the video signal and the switching signal from the transmitting end of subscriber B, while, for the next 20 milliseconds on the screen 15 no image will appear, but the cathode ray beam passing through the objective 22 will scan the figure of the subscriber A. The rays as reflected by subscriber A will be picked up by the photocell 2 which will transform them into an electric signal that will be sent to the successive apparatus in the post A. At the same time the subscriber A will have started to speak whereby in the apparatus 6, 7, 8, 9 will flow the complete signals resulting from the modulation with the phonic signal of a line frequency signal, and from the mixing of the video signal with the switching signal, said signals being-composed into a single composite signal in the mixer 8, and then, through the amplifier 9 and the crystal rectifier 10, the composite signal is transmitted to the subscriber B.

This signal, as already stated, will feed directly the small motor 4b that will start to run, driving in its motion its associated drum carrying the tracks (similar to drum 23) for generating the reticle and the switching signal to be sent to the subscriber A. The same signal will be sent to the grid of the tube 1b upon which will act the switching signal and video signal, while the separated phonic signal will go to excite the hand set telephone 5b of the subscriber B.

With the feeding system conceived for the small motor 4b there is assured, as already stated, the perfect speed and phase synchronism between the two cylinders of the two generators 3 and 3b.

Meanwhile, the subscriber B, who has heard the call signal, will pick up the telephone hand set 5b and take a place in front of the tube 1b on the screen whereof will appear, for 20 milliseconds intervals, the image of the subscriber A, and for the next 20 milliseconds, alternately with the above said first 20 milliseconds, the cathode ray beam will operate as a scanner of the figure of the subscriber B, which will then be transmitted through the photocell 2b, the mixer 7b, the mixer 8b, the amplifier 9b, the rectifier 10b to the wire L, and thence to the receiving end at the subscriber A.

If however the cathode ray tubes 1 and 1b should operate without a particular expedient, there would be the inconvenience that during the intervals during which each of them operates as a scanner of the figure of the respective subscriber there would appear on the screen of said tube a luminescence that would result in rather dim images, thus decreasing the luminosity contrast between the different parts of the transmitted image. Such an inconvenience may be obviated in several ways. Possibilities are the following: one way would be that of using a rectangular reticle of a height (or width) twice the normal size and one half of which should be utilized for transmitting, and the other half for receiving; according to another system, it would be possible to use cathode ray tubes of a particular type, expressly designed, with a screen formed by two overlaid layers of fluorescent substances, clearly distinct, one of which would emit radiations for instance with an applied anode voltage of 600 volts, and the other with a higher applied anode voltage, for instance, of 900 volts. The first layer, the one that is not in contact with the glass of the tube, emits only invisible rays (infrared or ultraviolet) while the second one, that is the one in contact with the tube glass, emits luminous rays. Such a cathode ray tube will operate as follows: During the scanning periods the anode voltage applied will be relatively low, whereby the screen will emit only invisible rays, since the electrons of the cathode beam will not have a sufficient energy to excite the layer in contact with the glass, and this invisible beam will effect the scanning of the figure or other part to be transmitted to the other subscriber, while during the receiving periods, alternated with the preceding ones, the anode voltage will automatically be brought, by an opposite and simple switching control actuated by the switching signal, to a higher value, whereby the screen will emit simultaneously invisible and visible rays, and on same there will form the image of the other subscriber. In this way there is eliminated the luminous background during the pick-up periods by soothing the contrasts which result in a poor transmitted image.

Further, with the kinescope types adopted in these installations, the electric power consumption is very low, for instance, to some one hundred milliwatts or slightly more, and similarly very small power is required for the electromagnetic deflection coils. However, the deflection of the cathode ray beam may be obtained in an electrostatic way. In any case the tube operates at an anode voltage of less than 1000 volts whereby the over-all supply source of each receiving and transmitting post may be small and light in weight with the consequent evident advantages.

Further, the circuits of the transducers, mixers, amplifiers, and switches, being a part of the above described posts, may be realized with electronic tubes or with semiconductors, but these last ones will generally be preferable inasmuch as they allow a remarkable reduction in size, weight, power consumption, and cost. It will thus be possible to realize a desk or wall type televideophone having a size and weight not much larger than those of an ordinary telephone apparatus, inclusive, of course of the call elements.

If said apparatus utilizes semiconductors, a large number of them may be placed within the connection tube between the microphone and the speaker of an ordinary telephone hand set with an additional remarkable saving in space. Then, the kinescope or cathode ray tube, with a screen having a diameter of only 8 or 10 centimeters, together with the relevant mirrors, may be placed to the right or to the left, for instance, of the ordinary telephone apparatus while the reticle generator, with its relevant small motor (an assembly that may have a size for instance of 7 by 7 by 7 centimeters) may be placed on the other side of an usual telephone apparatus.

Further, there is the possibility of the need for transmitting images with different fineness details according to the wishes or the requirements of each subscriber. Indeed, should it be desired to show, in a certain moment of the transmission, a document or drawing, or portion of human tissue, for which it would be necessary to provide a more detailed image, such finer detail could be easily obtained in a simple way by adding, on the small cylinders 23 and 23*b*, an additional track, for instance, at a frequency of 150 or 200 lines, besides the normal 50 or 100 lines. The switching from one track to the other may be effected simply by pressing a button that can be provided on the handgrip of the telephone hand set whereby it is possible to switch almost instantly at the subscriber's will from the 50 line frequency track to the additional 150 line frequency, and at the same time from the motor speed corresponding to 25 frames per second to the speed corresponding to two and a half frames per second, if it is not wanted to increase the frequency range adopted. Of course, when the subscriber changes over to the supplementary track, he has to warn accordingly the other subscriber so that he too may effect the corresponding switching over from one track to the other.

Another very important expedient which may be adopted to simplify the apparatus required for modifying the system of the present invention is the particular starting arrangement provided for the small motors 4 and 4*b*. Said starting arrangement involves the use of the switching track P for generating, during the motor starting period, of a voltage at a gradually increasing frequency from zero to the normal operating frequency. Said voltage will supply the small motor of the called subscriber without there being required, for the starting of these motors, the usual starting power that, as is well known, is equal to about ten times the standard rating. With such an arrangement, the amplifiers at each installation post, according to the present invention, may be much smaller since, during the starting period, there is required no power higher than necessary for the normal operation.

Figure 3:
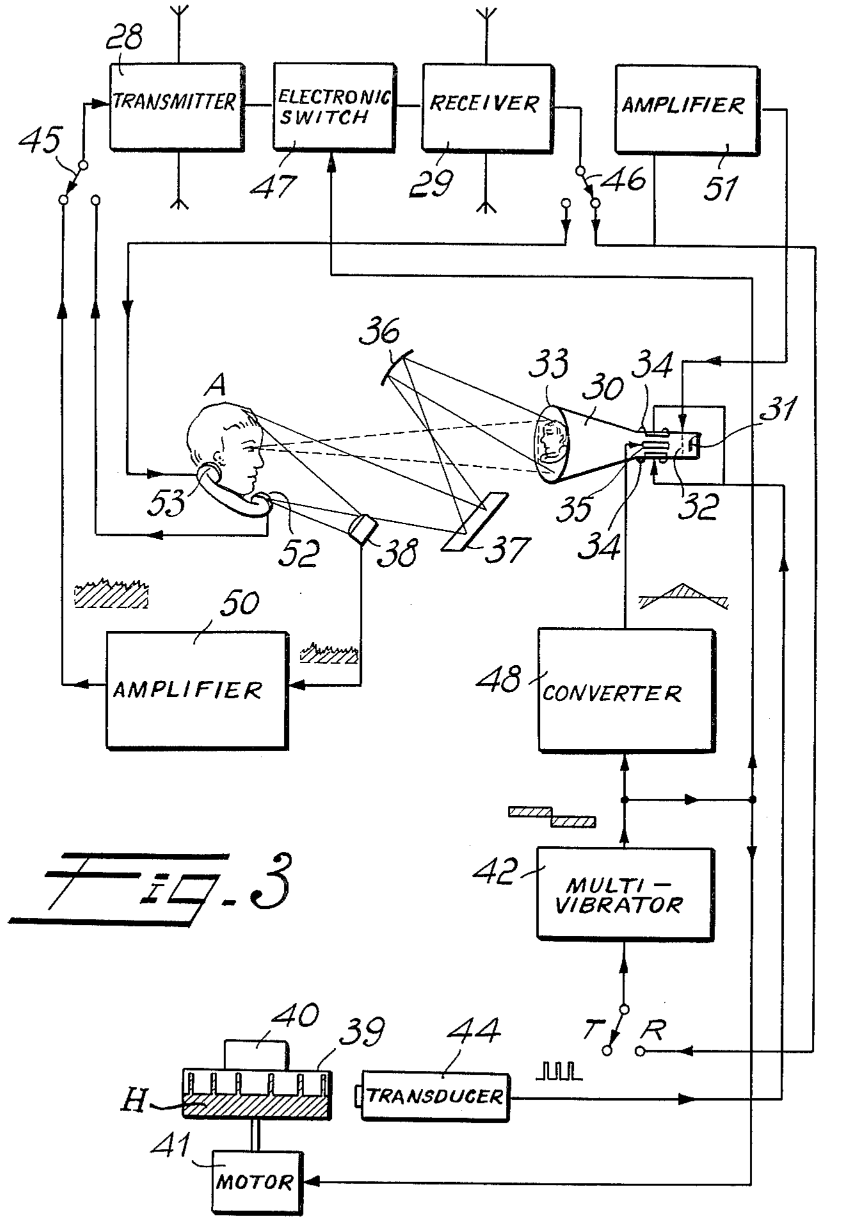
FIGURE 3 shows diagrammatically a receiving and transmitting end or post of a bilateral televideophonic installation for wireless transmission.

In FIGURE 3 there is illustrated the block diagram of a receiving and transmitting equipment for each subscriber of a bilateral system of television-telephony, using wireless transmission. Such a system, in the example as illustrated, allows the bilateral transmission of the video signals only, while the phonic transmission is bilateral only at successive alternate intervals. If, however, on the rotating generator cylinder or disc carrying the tracks there is provided also a track that will generate a line frequency, for instance triple of that considered above (and not desiring to increase the range of modulation) the speed of the small motor may be reduced, for instance, to one tenth of the preceding speed, should the cathode ray tube screen have a long persistence portion. In this way it will be possible by changing the motor speed at will to obtain a more detailed image, even while speaking, of the other subscriber.

The generator in this case is a part of every receiving and transmitting post, such as the one illustrated in FIGURE 3, may be similar to those designated with 3 and 3*b* in the FIGURES 1 and 2, i.e., it would include a small cylinder or disc 23 with three tracks. But in this embodiment of such generators there would be provided a generator with a rotating element (disc or cylinder) provided with only one track generating the line frequency voltage.

More precisely in FIGURE 3 there is indicated with 28 the transmitter that, by means of the associated antenna, radiates the video and phonic signals from the subscriber A, while with 29 there is indicated the receiver of the carrier wave modulated by the video and phonic signals of the subscriber with whom the subscriber A will be communicating, for example, subscriber B. The connection of the other apparatus of the subscriber A with the transmitter 28 and the receiver 29 will be effected through a switching device, respectively 45 and 46 that, in a synchronized way, switch on said apparatus on the phonic and on the video circuits of the post A. Said apparatus 28 and 29 are also connected with the electronic switching device 47 for the video operation. With 30 there is indicated the cathode ray tube provided with a cathode 31 a grid 32, a luminescent screen 33 and the deflection coils 34 and 35. In this example, the image of the subscriber B is observed directly on the screen 33 of the tube 30 through an optical system constituted by a concave mirror 36 and a flat mirror 37 for reflecting the scanning beam during the pick-up intervals. With 38 there is indicated the photoelectric cell collecting the scanning rays reflected by the figure of subscriber A, as already described before.

The rotating generator, in this instance, and as already stated, is required to generate a single line frequency voltage and comprises the small cylinder 39 carrying the track H combined with the luminous ray coming from the light source 40. The small cylinder 39 is made to turn by the small motor 41, for instance at a speed of 25 revolutions per second, and is fed, in the example as considered, by a multivibrator 42 at 25 cycles per second. The transducer 44, combined with an amplifier, supplies the line frequency voltage (in this case at 2500 cycles per second) that is being sent to the coils 34.

The frame frequency voltage is supplied in this example by the multivibrator 42, synchronized by the line frequency voltage supplied by the above mentioned generator, and which shall have, in this instance, a frequency multiple of that of the multivibrator. The rectangular waves at 25 cycles per second derived from the multivibrator are transformed by the converter 48 into triangular waves, that may be of the rectangular triangle type (saw teeth) or of the isosceles triangle type. Said triangular wave voltage will supply the coils 35 for the frame deflection of the electronic beam of the tube 30.

In this example the switching voltage at 25 cycles per second is supplied by the multivibrator 42.

The operation of the wireless video-phonic system, of which the FIGURE 3 illustrates diagrammatically the equipment of a subscriber's post or section, is similar to that described for the preceding instance shown in FIG. 1.

When subscriber A has called a subscriber B, and upon connection of the respective power feeding set of the apparatus of either post, the electronic beam of the tube 30 will scan for the predetermined time interval the figure of A and the rays reflected by same will be collected by the photocell 38, amplified by the video transmission amplifier 50, and then sent to modulate the carrier wave in the transmitter 28. The antennas of the two posts A and B are switched, under control of the rectangular switching signal, so that for a fiftieth of a second A transmits the Video and B receives it, and for the next fiftieth of a second, B transmits the video and A receives it.

The video signal, as received by the receiver 29 of A, is amplified, in the example shown, in the amplifier 51 and sent to the grid 32 of the kinescope 30. For the transmission and the reception of the phonic signal which, as already stated, must take place at distinct intervals other than those for the transmission of the video, there are provided at each post circuits that run, for the transmission, from the microphone 52 of the subscriber A to the switching device 45 of the transmitter 28 where, at predetermined intervals, there takes place the modulation of the carrier wave by said phonic signal, while, for the reception, the circuit runs from the switching device 46 of the radio-receiver 29 to the telephone 53 of the subscriber A.

Both for the video and the phonic signals the process ot transmission and reception is symmetrically repeated for the subscriber or post B, the only difference consists in the fact that the small motor of called post B is actuated by a rectangular voltage wave coming from a multivibrator similar to 42 which is synchronized by the signal arriving from A.

Of course, if the posts such as A are not stationary but transportable, the power supply shall be a battery and the multivibrator shall be indispensable.

It is however possible to obtain also wireless transmission with a single carrier wave the simultaneous bilateral video-phonic transmission by using a frame frequency not exceeding 5000 cycles per second.

Figure 4:
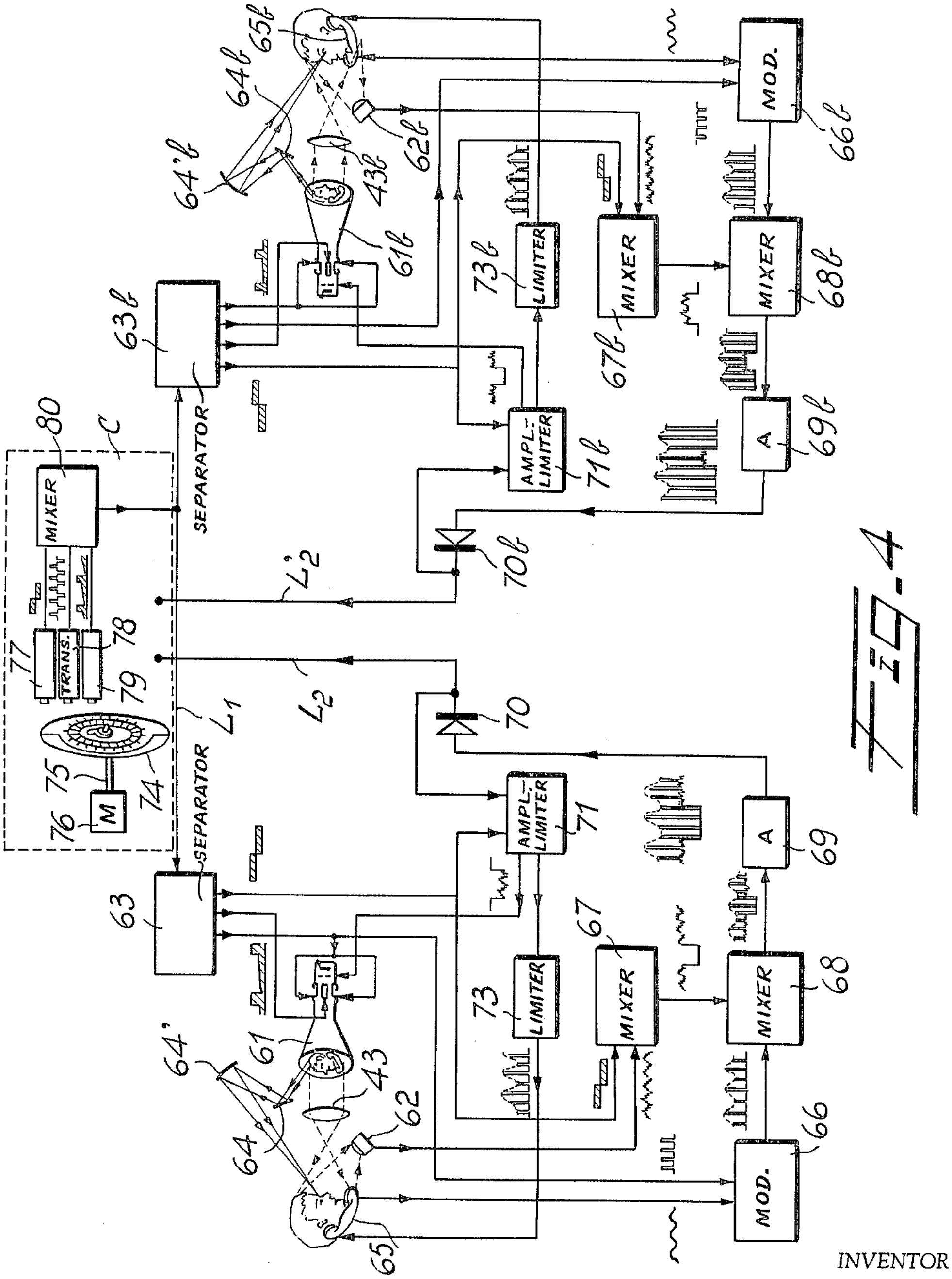
FIGURE 4 shows the diagram of a simultaneous bilateral televideophonic installation with automatic exchange and transmission by wire or coaxial cable.

The FIGURE 4 illustrates diagrammatically a simultaneous bilateral televideophony installation, by wire or coaxial cable, and comprising an automatic exchange of the type adopted in the standard automatic telephone installations, and wherein there is provided a single rotating generator for producing the reticle and the switching signal voltages, inasmuch as said voltages may be, to good advantage, transmitted automatically, in this instance, through connecting lines to every pair of subscribers that are being connected to each other, following a call from one of them. In other words, upon the completion of the connection between the two subscribers A (calling) and B (called), there are automatically sent to both subscribers the line frequency, the frame frequency, and the switching voltages required for the operation of a television-telephony installation, according to the present invention.

In FIGURE 4 there are shown the receiving and transmitting equipments of two subscribers A and B, in mutual communication, and in C the automatic exchange of which there are shown only the rotating generator of the above mentioned voltages, and the equipment relating to same.

The sections or posts of the subscribers A and B are in this case practically the same as the posts of FIGURE 1, except for the lack in each of said posts of the generator 3 (or 3*b*) and of the small motor 4 (or 4*b*). Indeed, the subscriber A post in FIGURE 4 comprises: a cathode ray tube 61, adapted to operate, at short alternate intervals, as a kinescope and as a television pick-up camera, combined with an objective 43 for the scanning beam for the figure of the subscriber A, and with a mirror system 64 and 64' for reflecting the image of the subscriber B when same appears on the screen of the kinescope 61. The photocell 62 that collects the rays reflected by the figure of A supplies the mixer 67 to which are also being sent the switching signals as in the mixer 7 of FIGURE 1.

Instead of the reticle generator 3 there is in this case the separator 63 to which arrives from the exchange C, over the line L1, the composite signal generated at the exchange, and comprising: the switching signal, the frame frequency signal, and two line frequency signals as carriers for the phonic signals from A and B, and one of which is used also for forming the reticle. To transmit the phonic signal the microphone of the telephone hand set of the subscriber A is connected to the modulator 66 that modulates with said phonic signals the line signals coming from the separator 63, and the outputs of 66 and 67 go to feed an additional mixer 68. The composite outgoing signal from the 68 output, suitably amplified by the amplifier 69, passes through the rectifier crystal 70, and thence over the wire L2 connecting through the exchange C the subscriber A to the subscriber B.

The similar composite signal sent from B to A, also over the line L2, is received by the amplifier-limiter 71, the video signal being sent from here to the tube 61 grid, while the other signal is sent from 71 to the phonic signal limiter integrator 73, from where said phonic signal is fed to the telephone or speaker of subscriber A hand set 65.

At the exchange C there is provided, as already stated, a single reticle generator supplying the cathode ray tubes of all the subscribers depending from said exchange. Said generator comprises: a rotating element that, in this instance (there being no reason to reduce to a minimum the size of the unit), may be a disc 74 of large dimensions keyed on the shaft 75 of an electric motor 76. The disc 74 carries, in the case considered, at least three tracks, one of which is double, respectively for the switching signal, the frame frequency signal, and a line frequency double signal, this double signal to serve as carriers for the phonic signals of A and B respectively, and one of which serves also as line frequency for generating the reticle.

In FIGURE 4 there can be seen with each of the above mentioned tracks a combined transducer-amplifier for producing the corresponding electric signals, and the outputs of the transducers 77, 78 and 79 are fed to the mixer 80 supplying the corresponding composite signal to the line L1 connecting the exchange with the subscribers.

Of course, the necessary signals may be obtained with a number of tracks on the disc 74, either larger or smaller than that considered in FIGURE 4.

There is thus assured the perfect synchronism between the switching signals and those generating the reticle for each pair of interconnected subscribers. The elements located at the subscriber post B correspond exactly to those of the post A, as in the case of FIGURE 1; hence they will not be now described in detail, and, in the drawing, they will be designated by the same reference numerals with the addition of a *b*.

It is important to note that the apparatus set out in FIGURE 4 affords to each calling subscriber the possibility of asking, at any time, for reticles with a different number of lines, interlaced or not, all transmitted over the line L2 distributing the reticle and switching signals since they are approximately in the same frequency range.

At the videophonic exchange C there will then be provided several rotating generators that will supply, for instance, signals for reticles having a line frequency equal to 100, 300, 600, 1200, and still others.

However, if it is desired to increase the number of lines and not to increase too much the width of the band to be transmitted, it is necessary to reduce the number of frames, and consequently, for a higher image fineness there will correspond a smaller mobility of same.

Of course, in this instance, it will be preferable that the subscriber be provided with different kinescopes with fluorescent screen of different persistence, or with a kinescope having a screen subdivided in squares or rectangles of different persistence. The automatic request for one or another reticle may be obtained for instance with the addition of alphabet letters on the disc dial carrying as usual the figures from 0 to 9. Of course to each of the letters carried on the dialing disc there will correspond a different fineness of the image, i.e., a reticle having a different number of lines.

Figure 5:
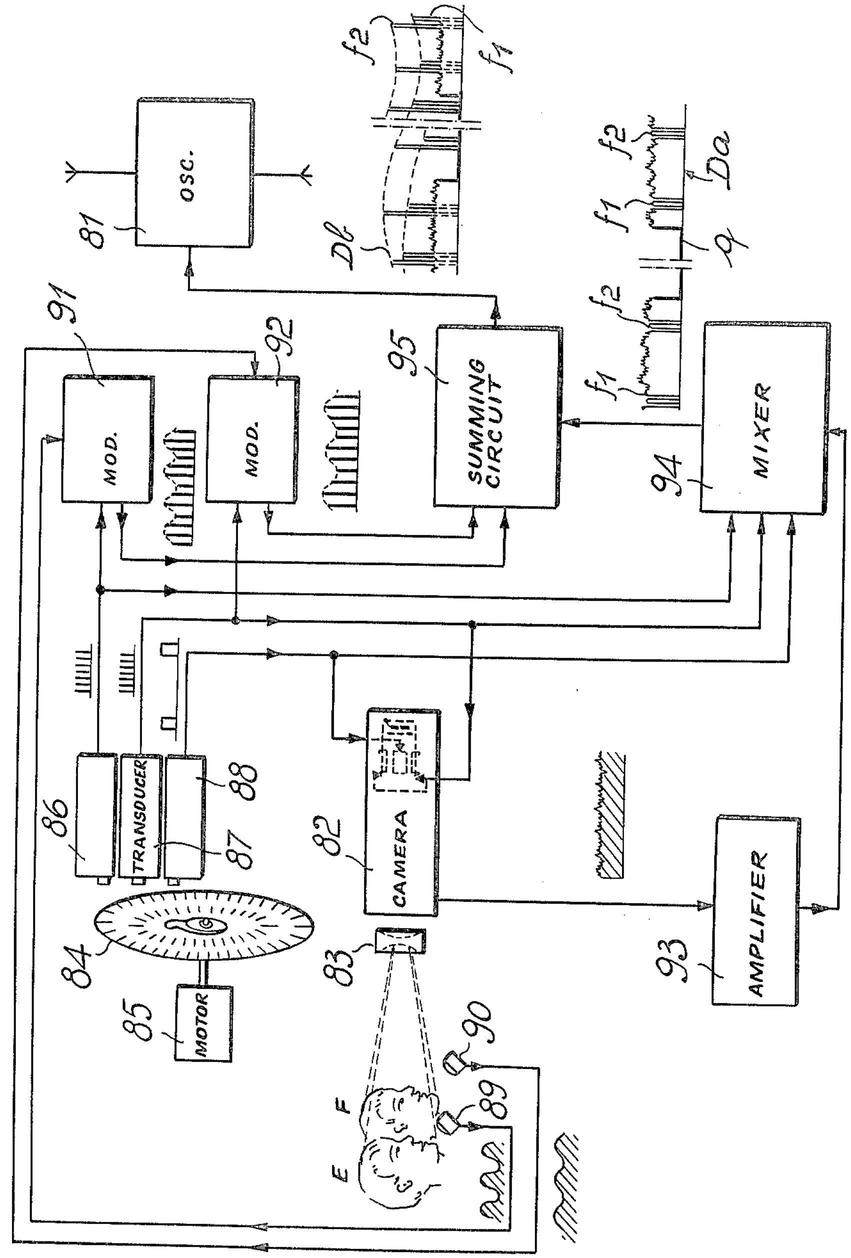
FIGURES 5 and 6 illustrate, respectively, a transmitter and a receiver of a one-way televideophonic wireless installation, allowing the simultaneous transmission of a video signal and of several phonic signals.

The embodiment, in the way of example, shown in the FIGURES 5 and 6 illustrates a particular application of the system of the present invention, and shows a one-way televideophonic arrangement with wireless transmission (that is, a particular system of radiotelevision broadcasting) with the transmission of a single video and two phonic signals at a time. In this case, as a simultaneous bilateral communication is not needed, the assembly is remarkably simplified inasmuch as at each receiving post there will be omitted the rotating transducer and the transmitting apparatus.

A television broadcasting system, according to the present invention, affords a very remarkable reduction in costs, size, and weight, both for the transmitter and for each receiver, and offers moreover the possibility to have the video accompanied not by one but by two, three and even more simultaneous phonic transmissions. This fact constitutes an advantage, the importance whereof will be steadily increasing as television transmissions will be broadcast over wide zones of territory inhabited by a population speaking different languages.

To the above mentioned advantages, the system adds the advantage of reducing the frequency bands necessary for videophonic transmissions, for instance, it will be possible to reduce the width of the band from 7 to 5 megacycles, as well as that of being able to adopt a single type of modulation.

As is evident from the FIGURES 5 and 6 of the drawings, the transmitter of the system in question becomes in this case an amplitide modulation radiophonic transmitter, except for the larger band width with the combination therewith of the rotating generator of the reticle voltages, and each receiver becomes a wide band radio receiver with the addition of a kinescope.

In FIGURE 5, where there are illustrated in some detail only the characteristic portions, 81 indicates the transmitting oscillator generating the carrier wave amplitude modulated by the videophonic signal. With 82 there is indicated the camera tube and 83 is the objective focusing the image to be transmitted. The reticle generator for the tube 82 is constituted by a disc 84 driven by a small synchronous motor 85. In the example shown, the disc 84 carries three tracks; one for the line signal, obtained through the transducer 86, and arranged to constitute also the carrier for the first phonic signal; a second track, at the same frequency as the preceding one, adapted to generate, through the transducer 87, the carrier voltage for the second phonic signal; and a third track, adapted to generate through the transducer 88, the frame frequency voltage for the tube 82 reticle. Of course, as in the preceding instances, the above voltages could be obtained with a different number of tracks. With E and F there are indicated the figures of two people that are speaking simultaneously in two different languages, and it is convenient that these constitute also the image it is wanted to transmit. The two phonic signals coming from the two microphones 89 and 90 are fed to the modulators 91 and 92, respectively, to modulate the two carrier voltages at the outputs of the transducers 86 and 87.

The video signal at the output from the television camera 82, if necessary, is amplified by the amplifier 93, and then fed to a circuit 94 where there are arriving also the three voltages from the outputs of the three transducers 86, 87 and 88. At the output of the circuit 94 there appears the video signal, no more continuous as when it entered same, but interrupted by the two phonic signals ($f_1$ and $f_2$) and by the frame signal ($q$) as it is quite evident from the diagram D*a* shown in FIGURE 5.

The signal at the output from the circuit 94 is fed to the summing circuit 95, where there are arriving also the impulses modulated respectively by the two phonic signals in the modulators 91 and 92. The complete signal, at the output of the summing circuit 95, is sent to modulate the wave generated by the oscillator 81 and thence propagated in order to be picked up by the different subscribers.

The receiver of every subscriber in said system is diagrammatically shown in FIGURE 6, the same being substantially similar to a radio receiver and more precisely it comprises: a radio receiver with antenna 96 where there is obtained, as a demodulation product, the videophonic signal; a kinescope 97, a limiter-separator 98 for the frame signal, a limiter-separator or discriminator 99, for the two phonic signals, a trimmer or peak limiter 100 of the modulated line signals, and two head-sets or other hearing devices 101, 102 for the separate and simultaneous reception of the two phonic signals.

The operation of the receiver just described is as follows. When the receiver is operating and the transmitter of FIGURE 5 is transmitting to the antenna of the radio-receiver 96 there will arrive the carrier wave of a predetermined frequency, modulated by the complete signal and propagated by the antenna of the transmitting equipment 81. This wave will be demodulated in 96 and, from the resulting complete signal, there will be separated, in 98, the frame frequency signal that is being sent to the respective frame deflection coils of the kinescope 97. The complete signal is being supplied to the grid 103 of the kinescope 97, as well as to the limitator-separator or discriminator 99, where there are separated the two phonic signals, and sent respectively to the two bearing devices 101 and 102. The line frequency signal supplied from the transducer 86 and which had been modulated at the transmitter with one of the phonic signals is sent over the trimmer or limiter 100 to the line deflection coils of the kinescope 97. Thereby, on the screen of said kinescope there will be described, by the cathode beam, a reticle in perfect synchronism with the one of the pick-up camera 82 at the transmitting exchange, and two or more people will all be able to watch the same image and to hear one of the phonic transmissions in one language, and the other to hear the transmission in the other language, different from the first one. In the example as illustrated, there have been considered two simultaneous phonic signals only, but it is easily understood that the number of said simultaneous phonic signals may be higher without causing difficulties in the arrangement of the relative equipment as described above.

Of course the carrier signals for the single phonic signals shall have, at the input of the discriminator, sufficiently different amplitudes to allow the separation of each single phonic signal from the others.

In the FIGURES 7 and 7*a* there are shown the electrical diagrams of two phonic signal limiter-separators or discriminators such as that shown with 99 in FIGURE 6, but wherein the phonic signals to be separated are three in number. The circuit of FIGURE 7 includes three electronic tubes 104, 105 and 106, the first of which is a triod, and the other ones are tetrodes. On the anode circuits of each of these tubes there is connected a head set such as those 101 and 102 in FIGURE 6, or other hearing device, which, in FIGURE 7, are respectively indicated with 107, 108 and 109. Of course, if at a receiving post it is required only to hear a single phonic signal, there will be only one hearing device, inserted in the corresponding anodic circuit for that phonic signal.

The tubes 104, 105 and 106 are connected in parallel on the leads 110 and 111 leading to the anode battery B*t*. To the grid 112 of the triod 104 there is applied the composite signal comprising the three phonic signals *a*, *b* and *c*. Each of said signals modulates voltage impulses, each of an adequately different value than the other. To the same grid 112 there is applied a biasing negative voltage such as to cut off the carrier voltages of smaller value modulated by the two phonic signals *b* and *c*, whereby only the signal *a* can pass into the anode circuit of the triod 104, and thus be heard, it alone, through the head set 107 or the like.

To the first grid 113 of the tube 105, biased so as to cut off only the signal *c*, there is also applied the composite signal containing the three phonic signals *a*, *b*, and *c*; while to the second grid 114 there is applied, through the capacitor 115, the voltage corresponding to the signal *a*, whereby in the anode circuit of said tube there will pass only the signal *b* that will be audible in the head set 108, inasmuch as upon passage of the signal *a*, the tube 105 is being blocked.

Similarly, to the second grid 117 of the tube 106 there are applied, through the capacitors 118 and 119, the signals $a$ and $b$, whereby of the three signals constituting the composite signal applied to the grid 116, there will pass in the anode circuit of said tube only the signal $c$, audible in the head set 109.

The FIGURE 7$a$ shows the diagram of another discriminating or separator circuit, similar to that of FIGURE 7, but wherein the electronic tubes are replaced by three semiconductors 120, 121 and 122. Since however the way of connection and feeding of these semiconductors is similar to that of the three tubes 104, 105 and 106 of FIGURE 7, it is not deemed necessary to describe in detail the circuit of FIGURE 7$a$, since its operation is wholly similar to that of FIGURE 7.

As the number of the phonic signals to be simultaneously transmitted increases, it is convenient to increase the length of the reticle lines so that the portion of each impulse interested by the phonic signals leaves the kinescope screen.

In a transmitter such as that of FIGURE 5, the pick-up camera tube 82 shall preferably be of the flying spot oscillographic type for the transmission of movie films or the like, while it will advantageously be a tube of the bunching type (image orthicon, or vidicon, or the like) for the direct pick-up of scenes or objects.

The above described system may also be realized with an interlaced reticle, as is easily understandable.

The track printed on the rotating members of the generators of the electric voltages necessary for generating the reticles on the cathode ray tube screens and for the other tasks stated above may be of any desired or preferred type. There may thus be tracks of the type that can be scanned with luminous or invisible radiations, or of an electrical, electronic, magnetic or equivalent type, and combined with corresponding members for transducing into electrical magnitudes all that is printed on said tracks.

From the preceding description it is apparent that the present invention permits the simultaneous bilateral videophonic transmission of signals over a single wire or a single carrier wave that heretofore has not been obtained. Furthermore, the equipments are extremely simple and unexpensive.

Indeed, the perfect operating synchronism of the subscriber posts, communicating between one another, is obtained, according to the invention in a precise way, and by means of very reduced apparatus, inasmuch as at each receiving post it is the very videophonic signal received from the transmitting post that assures the desired synchronism. The videophonic signal received, such as it is, is sent both the the small motor of the rotating generator of the video reticle and to the oscillographic tube and, through a limiter-separator, to the telephone or loudspeaker.

In particular, a transportable radio receiving and transmitting set is realized, according to the present invention, by combining a conventional radiophonic receiver-transmitter with an electric motor of a few milliwatts rating that drives a small disc carrying the tracks, a small oscillographic tube, and a few semiconductors. It is thus evident how the weight, volume and cost of such a set may be extremely small.

In the examples as illustrated and described above, it was assumed that the reticles were of the parallel lines types, obtained by means of a frame frequency voltage (or current) and a line frequency voltage (or current), but evidently the reticles of the different cathode ray tubes may be of any other known or preferred type and even in such cases the necessary electric voltages could be obtained with the rotating generators considered above.

All such variants therefore will fall under the present invention.

It should be understood that the system and equipments described above and illustrated in the drawings are merely illustrative and not limited thereto, and that the types and characteristics of the different components the same may vary according to needs without thereby departing from the present invention or the scope of the appended claims.

What I claim is:

1. A simultaneous bilateral televideophonic communication system comprising a plurality of receiving and transmitting posts, each post including a cathode ray tube adapted to function alternately as a scanning device and as a kinescope, a reticle on the face of said cathode ray tube, a signal generator connected to said tube for producing synchronized voltages for controlling the reticle on the screen of said tube at one post and for controlling the switching of said tube from a scanning device to a kinescope at another post, a photosensitive device adjacent said tube for scanning an image to be transmitted, sound transmitting equipment at each post for providing audio signals, first mixer means for combining signals from said generator and said sound equipment, second mixer means for combining signals from said generator and said photosensitive device, and third mixer means connected to said first and second mixer means for producing a single composite signal, a single signal transmission means between said posts for transmitting said composite signal, and amplifier-separator means responsive to said signal generator for receiving an incoming composite signal connected to said cathode ray tube grid and providing therefor a video signal and a switching signal whereby tne tube is operated alternately as a scanning device and as a kinescope, said amplifier-separator means also being connected to said generator and to said sound equipment.

2. A simultaneous bilateral televideophonic communication system comprising a plurality of receiving and transmitting posts, each post including signal generating means producing synchronized voltages for generating a first reticle, a second switching, and a third pulsed carrier waves, sound equipment, a cathode ray tube adapted to function alternately as a scanning device and as a kinescope, a photosensitive device, a first mixer for combining said carrier wave with signals from said photosensitive device for controlling the cathode ray tube at the called post, a second mixer connected to said sound equipment for mixing said sound equipment signals with the line frequency signal from said generating means, a third mixer connected to said first and second mixers producing a composite signal for transmission to the called post, and an amplifier-separator-limiter for receiving the transmitted composite signal and providing the control voltage to the signal generating means at the called post, said signal generating means providing line and frame frequency voltages to said cathode ray tube, a video signal to said receiving cathode ray tube, and a sound signal to said sound equipment.

3. A simultaneous bilateral televideophonic communication system comprising a central automatic exchange including signal generating means producing a first reticle, a second switching, and a third pulsed carrier waves, said waves being transmittable to all calling and called posts, each post comprising sound equipment, a cathode ray tube adapted to function alternately as a scanning device and as a kinescope, a signal separator means connected to said exchange and said cathode ray tube, and to said sound equipment, a photosensitive device, a first mixer receiving signals from said photosensitive device and said carrier wave from said signal separator means producing a signal containing a switching component for controlling the cathode ray tube at the called post, a modulator connected to said sound equipment and said separator means, a second mixer connected to said first mixer, said modulator, and said exchange producing a composite signal for transmission to the called post through said exchange, and a receiving amplifier-limiter connected to said separator, said cathode ray tube, and to said sound equipment.

4. A simultaneous bilateral televideophonic communication system comprising a plurality of posts and a central exchange including signal means for producing synchronized waves for reticle, switching, and carrier voltages, each post comprising sound responsive transmitting equipment for establishing communication between two transmitting and receiving posts and said exchange, a cathode ray tube adapted at each post responsive to said switching voltage to function alternately as a scanning device and as a kinescope, a photosensitive device adjacent said tube for scanning the image to be transmitted, a first mixer for mixing the output from said photosensitive device and said switching voltage, modulating means for combining sound signals from said sound equipment with said carrier voltage, a second mixing means connected to said first mixer and said modulating means for producing a composite signal for transmission to the called post, and an amplifier-limiter responsive to said signal means for detecting the received composite signal connected to said sound equipment, said cathode ray tube, and to said central exchange.

5. A communication system according to claim 4 wherein the central exchange signal means comprises means to generate reticles of different lines and frames in order to have images of different fineness, and wherein each post comprises as many cathode ray tubes as there are different signal means to enable each calling post to call for the formation of different reticles, each said cathode ray tube at each post having a screen of a particular persistence corresponding to the different frame and line frequencies.

References Cited by the Examiner

UNITED STATES PATENTS

| | | | |
|---|---|---|---|
| 1,980,150 | 11/1934 | Baird | 178—6 |
| 1,987,686 | 1/1935 | Kwartin | 178—6.8 |
| 2,017,883 | 10/1935 | Zworylin | 178—6.8 |
| 2,197,005 | 4/1940 | Nicolson | 178—6 |
| 2,314,471 | 3/1943 | Wright | 178—5.6 |
| 2,520,507 | 8/1950 | Marcy | 178—7.2 |
| 2,537,173 | 1/1951 | Szegho | 178—7.5 |
| 2,895,005 | 7/1959 | Kock et al. | 179—15 |
| 2,985,872 | 5/1961 | Beltrami | 340—345 |

DAVID G. REDINBAUGH, *Primary Examiner.*

T. G. KEOUGH, J. A. ORSINO, *Assistant Examiners.*